United States Patent [19]

von Haas

[11] Patent Number: 4,913,607
[45] Date of Patent: Apr. 3, 1990

[54] TOOL COUPLING

[75] Inventor: Rainer von Haas, Geesthacht, Fed. Rep. of Germany

[73] Assignee: Fried. Krupp Gesellschaft mit beschränkter Haftung, Essen, Fed. Rep. of Germany

[21] Appl. No.: 207,013

[22] Filed: Jun. 15, 1988

[30] Foreign Application Priority Data

Jun. 16, 1987 [EP] European Pat. Off. ............ 87108662

[51] Int. Cl.⁴ .............................................. B23B 29/26
[52] U.S. Cl. .................................. 409/234; 408/239 R; 279/83; 279/1 E; 279/1 TS; 82/158
[58] Field of Search ............... 409/234, 232; 279/1 A, 279/67, 68, 112, 17, 18, 83, 76, 85, 91, 1 B, 1 E, 32, 89; 82/160, 158; 408/239 R, 239 A, 240

[56] References Cited

U.S. PATENT DOCUMENTS

| 387,475 | 8/1888 | Whaling | 279/83 X |
| 2,974,967 | 3/1961 | Felmet | 279/89 |
| 4,352,500 | 10/1982 | Blättry et al. | 279/121 |
| 4,617,848 | 10/1986 | Eckle et al. | 408/239 R X |
| 4,714,390 | 12/1987 | Eckle et al. | 408/239 R X |
| 4,772,163 | 9/1988 | Scheer et al. | 409/232 |
| 4,797,041 | 1/1989 | Glaser | 408/239 R X |
| 4,813,831 | 3/1989 | Reinauer | 409/232 |

FOREIGN PATENT DOCUMENTS

| 73750 | 2/1952 | Denmark | 279/67 |
| 3108439 | 11/1982 | Fed. Rep. of Germany. |
| 3401200 | 7/1985 | Fed. Rep. of Germany ... 408/239 A |
| 1188713 | 4/1970 | United Kingdom | 279/32 |

*Primary Examiner*—Z. R. Bilinsky
*Assistant Examiner*—R. Schultz
*Attorney, Agent, or Firm*—Spencer & Frank

[57] ABSTRACT

A tool-and-tool holder assembly includes a tool having a tool shank; a tool holder having a receiving bore arranged for accommodating a stub of the tool shank; a clamping member disposed in the stub and being movable therein, generally perpendicularly to the shank; and two clamping screws supported in the tool holder and cooperating with the clamping member for axially tightening the shank against the tool holder. Each clamping screw has a first conical face and the clamping member has recesses each bounded by a second conical face. Upon tightening the clamping screws, the respective first and second conical faces are pressed against one another for generating an axial force component urging the shank into the receiving bore. At least one of the clamping screws has a third conical face, and the clamping member has a portion projecting over one of the recesses and having a fourth conical face. Upon unscrewing the clamping screw which has the third conical face, the third and fourth conical faces are pressed to one another for gererating a second axial force component urging the shank in a direction out of the receiving bore of the tool holder.

5 Claims, 2 Drawing Sheets

TOOL COUPLING

BACKGROUND OF THE INVENTION

The machining of parts involving chip removal is often performed by a modular tool system in which the part carrying the cutting bit is separated from the tool carrier (spindle or revolver) by a suitable coupling, sometimes with the interposition of an adapter and/or a reduction gear. The couplings often include cylinders (with planar contact faces) or cones. Couplings equipped with one or a plurality of cones may be self-locking and cylinders having planar contact faces may adhere to one another and therefore not only a clamping force, but also an oppositely oriented releasing force is needed.

German Pat. No. 3,108,439 discloses a drilling tool whose shank terminates in a cylindrical coupling stub and is surrounded by an annular shoulder extending perpendicularly to the axis of the drilling tool. The coupling stub is provided with a transverse bore and a connecting pin displaceable therein. The connecting pin has a conical projection or a conical recess at both ends. Coaxially with a radial clamping screw provided in the tool holder and diametrically opposite thereto, the tool holder supports a further identical radial clamping screw. If one screw is tightened, the connecting pin is displaced in the transverse bore until it is supported at the oppositely disposed cone of the other screw. As a result of this arrangement, identical forces act on both ends of the connecting pin. Due to the conical configuration of the connecting pin at both ends, axial forces are generated by camming action, producing a satisfactory clamping of the annular shoulder surfaces against those provided on the tool holder.

German Offenlegungsschrift (non-examined published application) No. 3,532,891 to which corresponds U.S. application Ser. No. 06/907,084 to Von Haas filed September 12, 1986 discloses a coupling connection without play. The connection is composed of an axial planar contact face, a short cone and a cylindrical terminal pin. This coupling connection can be tightened with the previously-described type of clamping arrangement. However, the coupling connection cannot be released by means of the holding (clamping) screws if the cone is self-locking.

SUMMARY OF THE INVENTION

It is an object of the present invention to provide an improved coupling device of the above-outlined type with which axial forces are generated in the opposite direction to the clamping forces during release of the securing screws.

This object and others to become apparent as the specification progresses, are accomplished by the invention, according to which, briefly stated, the tool-and-tool holder assembly includes a tool having a tool shank; a tool holder body having a receiving bore arranged for accommodating a stub of the tool shank; a clamping member disposed in the stub and being movable therein, generally perpendicularly to the shank; and two clamping screws supported in the tool holder body and cooperating with the clamping member for axially tightening the shank against the tool holder body. Each clamping screw has a first conical face and the clamping member has recesses each bounded by a second conical face. Upon tightening the clamping screws, the respective first and second conical faces are pressed against one another for generating an axial force component urging the shank into the receiving bore. At least one of the clamping screws has a third conical face, and the clamping member has a portion projecting over one of the recesses and having a fourth conical face. Upon unscrewing the clamping screw which has the third conical face, the third and fourth conical faces are pressed to one another for generating a second axial force component urging the shank in a direction out of the receiving bore of the tool holder body.

It is an important advantage of the invention that it is possible to generate axial clamping forces or opposite axial ejection forces when the clamping screws are screwed in or out, respectively. This arrangement makes it possible to tighten and release, for example, all self-locking cone connections or adhering cylinder connections.

DESCRIPTION OF THE PREFERRED EMBODIMENTS

Figure 1:
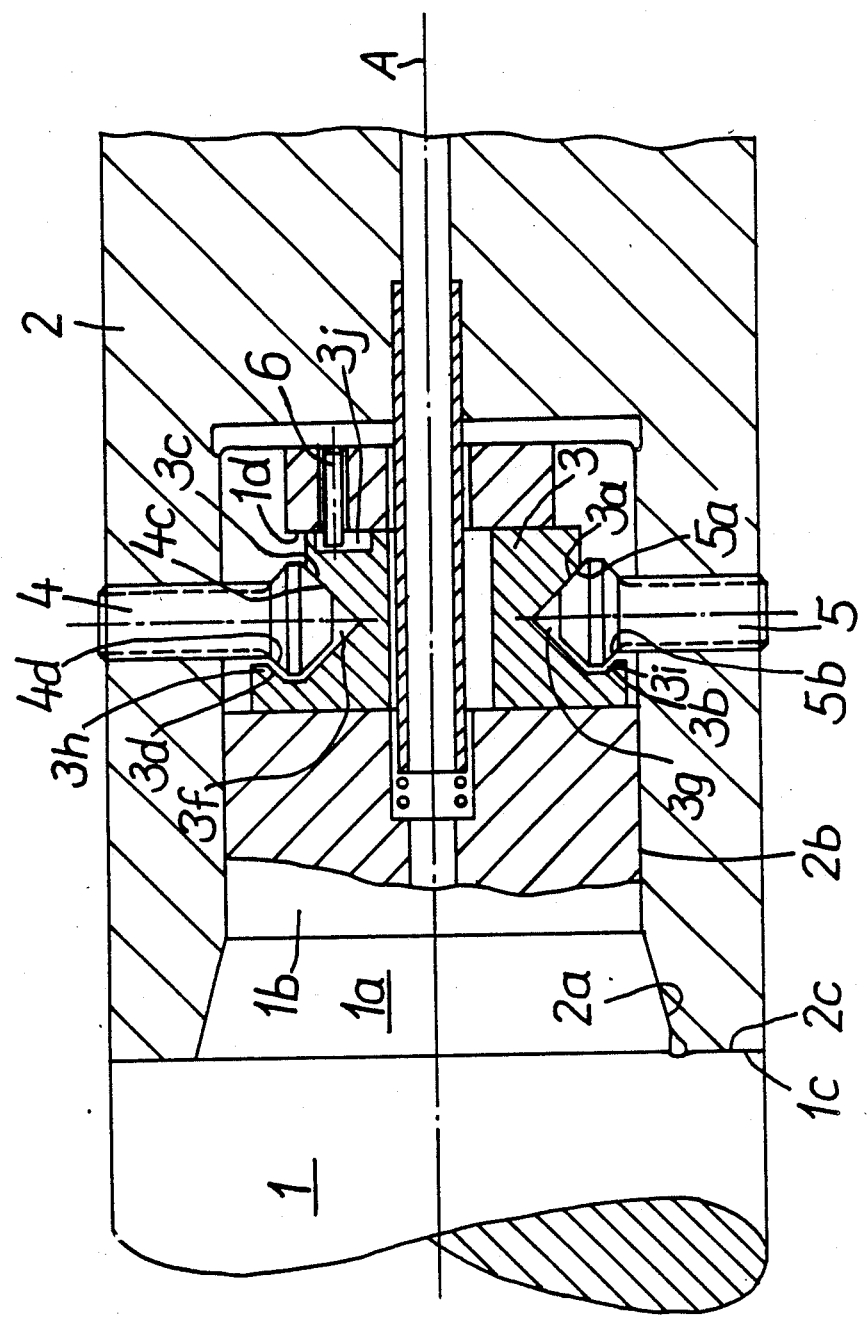
FIG. 1 is an axial sectional view of a preferred embodiment of the invention.

FIG. 1 shows a tool shank 1 including a planar contact face 1c and a mating stub or pin which is composed of a short cone 1a and a cylindrical member 1b. FIG. 1 further shows a tool holder body 2 having a terminal radial shoulder surface (planar contact face) 2c and a receiving bore which is composed of a conical bore 2a and a cylindrical bore 2b. Cylindrical member 1b has a transverse bore 1d in which a clamping member 3 is able to move in a radial direction relative to the axis A of the tool shank 1. The clamping member 3 can move parallel to the axis A only together with the tool shank 1 as a unit. A securing pin 6 limits the radial movement of clamping member 3 and prevents a rotation thereof about an axis perpendicular to the axis A. For this purpose, the securing pin 6 extends into a guiding slot 3j provided in the clamping member 3.

Clamping screws 4 and 5 pass through the wall of the tool holder body 2 at diametrically opposite locations thereof, such that the screws are in alignment with the transverse bore 1d of the tool shank 1, when the latter is inserted into the tool holder body 2. The screws 4 and 5 have respective conical end faces 4c and 5a. The radially shiftable clamping member 3 has recesses 3f and 3g bounded by respective conical faces 3a and 3c oriented towards the conical faces 5a and 4c of the screws 5 and 4, respectively.

For tightening the tool shank 1 against the tool holder body 2, one or both of the screws 4 and 5 are screwed inwardly. Thus, if, for example, the screw 4 is screwed in, the conical terminal face 4c thereof arrives into engagement with the conical face 3c of the clamping member 3 and displaces the clamping member radially, that is, transversely to the axis A, until the conical face 3a of the clamping member 3 arrives into contact with the terminal conical face 5a of the screw 5. A further screw-down of the screw 4 generates, by virtue of the camming action between the conical faces 3c and 4c and between the conical faces 5a and 3a, an axial force component which pulls the tool shank 1 axially into the tool holder body 2 and thus produces a pressing (clamping) engagement between the planar radial surfaces 1c and 2c as well as between the conical surfaces 1a and 2a of the tool shank 1 and the tool holder body 2.

In accordance with the invention, an outward turning (unscrewing), of at least one of the screws 4 and 5 results in a release of the tool shank 1 from the tool holder body 2 while simultaneously a positive axial releasing force, oriented oppositely to the earlier-described clamping force is generated. This result is achieved by a construction now to be described.

Adjacent the outer conical faces 4c and 5a of the respective screws 4 and 5, the latter are further provided with an inner conical face 4d and 5b whose conicity is oriented in the opposite direction as compared to the terminal (outer) conical faces which they adjoin. Furthermore, the clamping member 3 is provided with overhanging portions 3h and 3i projecting over the respective recesses 3f and 3g and having respective conical faces 3b and 3d.

If, for example, the clamping screw 4 is loosened and is continued to be screwed outwardly, its inner conical face 4d arrives into engagement with the conical face 3d of the clamping member 3 and first pulls the clamping member 3 radially until, on the other side, the conical feed 3b of the clamping member 3 arrives into engagement with the conical face 5b of the screw 5. A further outward screwing of the screw 4 generates an axial force oriented in the direction of the tool shank 1, outwardly of the tool holder body 2, by virtue of identical camming actions between the conical face 4d of the screw 4 and the conical face 3d of the clamping member 3 and between the conical face 5b of the screw 5 and the conical face 3b of the clamping member 3. It will be observed in FIG. 1 that the conical faces 3d and 3b of the clamping member 3 are oriented towards the rearward terminus of the cylindrical part 1b of the mating stub forming part of the tool shank 1. Thus, the outwardly oriented axial force generated as a result of the unscrewing of the screws 4 and/or 5, causes the tool shank 1 to be shifted with a positive force in a direction outwardly of the tool holder body 2. By virtue of the simultaneous contacting engagement of the screws 4 and 5 with the respective conical faces 3d and 3b by virtue of the initial radial shift of the clamping member 3, identical forces appear at the two screws, having a magnitude determined by the cone angles and the applied unscrewing forces.

Figure 2:
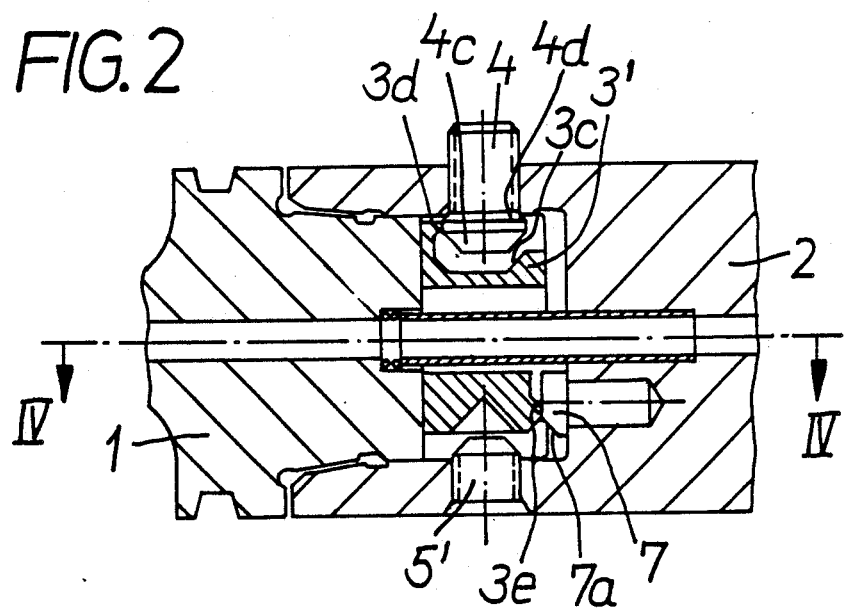
FIG. 2 is an axial sectional view of another preferred embodiment shown in the released state.
Figure 3:
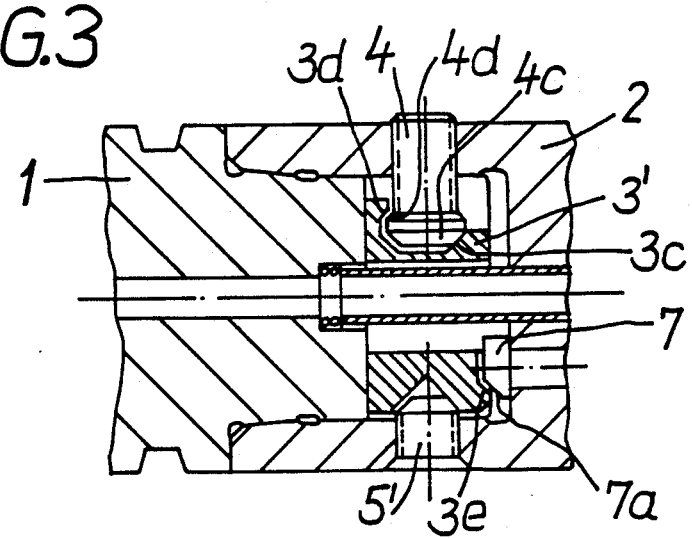
FIG. 3 is a view similar to FIG. 2, showing the embodiment of FIG. 2 in the tightened state.
Figure 4:
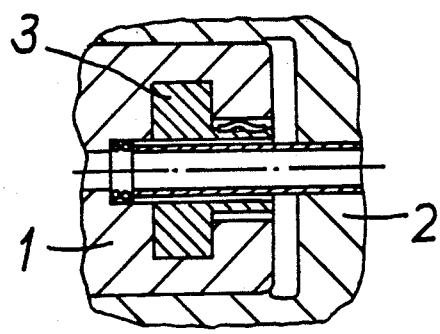
FIG. 4 is a sectional view seen along line IV—IV of FIG. 2.

Turning to the embodiment shown in FIGS. 2, 3 and 4, the clamping member 3' illustrated therein has a T-shaped cross section as may be observed in FIG. 4.

The tightening and releasing mechanism is similar to that described in connection with the embodiment shown in FIG. 1. The releasing of screw 4 causes its conical face 4d to be pressed against conical face 3d and pulls clamping member 3' and its sloped face 3e against sloped face 7a of a stop bolt 7 held in the tool holder body 2. In this case, holding screw 5' has only a simple, conical head.

FIG. 3 illustrates the construction in the tightened state. As compared to FIG. 2, the screw 4 has, by virtue of the engagement between faces 3c and 4c pushed the clamping member 3' radially into contact with the screw 5' and, by virtue of a camming effect similar to that described in connection with FIG. 1, the tool shank 1 has been pulled into the tool holder body 2.

It will be understood that the above described of the present invention is susceptible to various modifications, changes and adaptations, and the same are intended to be comprehended within the meaning and range of equivalents of the appended claims.

What is claimed is:

1. In a tool-and-tool holder assembly including
   a tool having a tool shank; said tool shank having a longitudinal axis and a terminal stub;
   a clamping member disposed in said terminal stub; said clamping member having a clamping member axis perpendicular to said longitudinal axis and said clamping member being movable along said clamping member axis;
   a tool holder including a tool holder body having a receiving bore for receiving said terminal stub and said clamping member; and
   two clamping screws threadedly supported in said tool holder body for cooperating with said clamping member;
   the improvement wherein
   said clamping member is in a force-transmitting relationship with said terminal stub in either direction parallel to the longitudinal axis of said tool shank,
   each said clamping screw has a first conical face and said clamping member has recesses each bounded by a first conical face; upon tightening at least one of said clamping screws, said first conical faces of the two screws are pressed against said first conical faces of respective said recesses of said clamping member for generating a first axial force component urging said shank into said receiving bore, whereby said shank is axially tightened against said tool holder body;
   at least one of said clamping screws has a second conical face adjacent said first conical face of said clamping screw;
   said clamping member has an overhanging portion projecting over at least one of said recesses and having a second conical face; upon unscrewing said clamping screw, said second conical face of said clamping screw and said second face of said clamping member are pressed to one another for generating a second axial force component urging said shank in a direction out of said receiving bore.

2. An assembly as defined in claim 1, further comprising a transverse bore being provided in said terminal stub; said transverse bore being oriented substantially perpendicularly to said axis; said clamping member being accommodated in said transverse bore; and a securing pin supported by said terminal stub and extending into said transverse bore for cooperating with spaced abutment walls on said clamping member to limit the length of said movement of said clamping member.

3. An assembly as defined in claim 2, further comprising a guiding slot provided in said clamping member; said securing pin projecting into said guiding slot.

4. An assembly as defined in claim 1, wherein said clamping member is of a crosssectional shape, with the cross section taken at a plane on said longitudinal axis with said plane being perpendicular to an axis defined by said clamping screws, of a rectangle with two rectangular cutouts taken from the rectangle at adjacent corners with said corners being on opposite sides of said longitudinal axis.

5. An assembly as defined in claim 1, wherein said overhanging portion including said second conical face of said clamping member is provided solely at one of said recesses.

* * * * *